(12) United States Patent
Grabmeier

(10) Patent No.: US 8,387,920 B2
(45) Date of Patent: Mar. 5, 2013

(54) DEVICE FOR LAUNCHING UNMANNED MISSILES FROM AN AIRCRAFT

(75) Inventor: Michael Grabmeier, Rosenheim (DE)

(73) Assignee: MBDA Deutschland GmbH, Schrobenhausen (DE)

( * ) Notice: Subject to any disclaimer, the term of this patent is extended or adjusted under 35 U.S.C. 154(b) by 92 days.

(21) Appl. No.: 13/034,369

(22) Filed: Feb. 24, 2011

(65) Prior Publication Data

US 2011/0209602 A1 Sep. 1, 2011

Related U.S. Application Data

(63) Continuation of application No. 11/766,343, filed on Jun. 21, 2007, now Pat. No. 7,926,764.

(30) Foreign Application Priority Data

Jun. 24, 2006 (DE) .......................... 10 2006 029 147

(51) Int. Cl.
*B64D 1/12* (2006.01)
(52) U.S. Cl. ...................... 244/137.3; 244/63
(58) Field of Classification Search .................. 244/63, 244/118.1, 137.1, 137.3, 137.4, 136, 129.5; 206/3, 317; 89/1.804, 1.815; 414/529
See application file for complete search history.

(56) References Cited

U.S. PATENT DOCUMENTS

| | | | |
|---|---|---|---|
| 3,769,876 A * | 11/1973 | Haas et al. | 89/1.8 |
| 4,040,334 A | 8/1977 | Smethers, Jr. | |
| 4,161,301 A | 7/1979 | Beardsley et al. | |
| 4,256,012 A | 3/1981 | Cowart et al. | |
| 4,923,148 A | 5/1990 | Fillingham et al. | |
| 5,763,811 A | 6/1998 | Ruzicka | |
| 5,816,535 A | 10/1998 | Underwood, Jr. et al. | |
| 6,789,766 B2 | 9/2004 | Horst | |
| 2004/0247422 A1 * | 12/2004 | Neumann et al. | 414/529 |

OTHER PUBLICATIONS

"463L Master Pallet." Wikipedia article. Retrieved Feb. 12, 2010. Document describes U.S. Air Force 463L Master Pallet, invented in 1959.*
"463L Master Pallet.", Wikipedia article. Retrieved Feb. 12, 2010. Document described U.S. Air Force 463L Master Pallet, invented in 1959.
Translation of DE10338963. Grabmeier, Michael.

* cited by examiner

*Primary Examiner* — Tien Dinh
*Assistant Examiner* — Michael Kreiner
(74) *Attorney, Agent, or Firm* — Greenblum & Bernstein, P.L.C.

(57) ABSTRACT

A device for launching unmanned missiles from an aircraft with a pallet, on which at least one container is provided to receive a missile. The container has an upper container section that has a pylon for the suspended, detachable support of the missile. The container has a lower container section that is embodied as a support area for the missile.

23 Claims, 3 Drawing Sheets

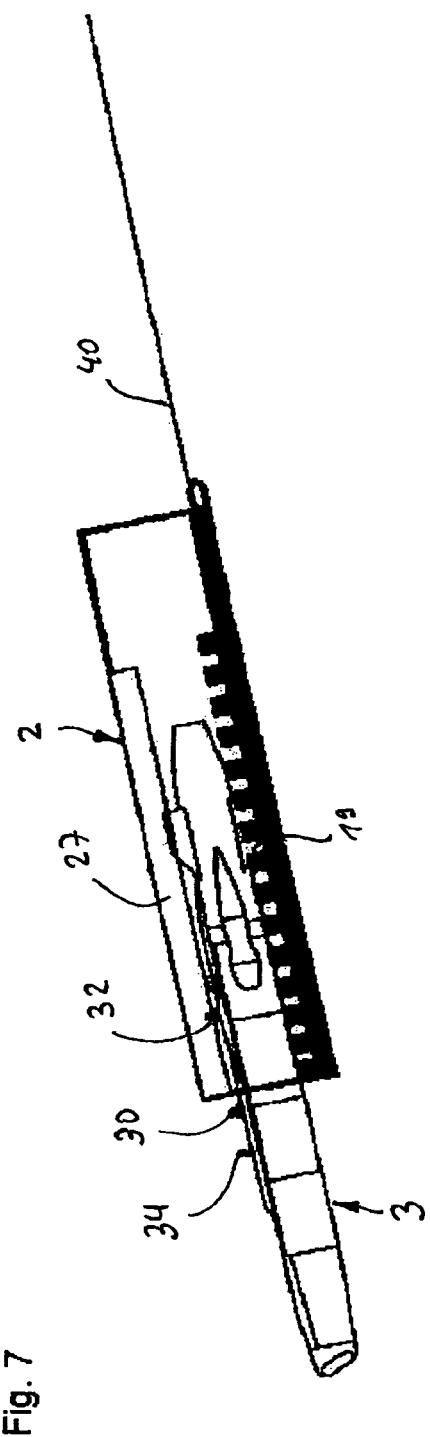
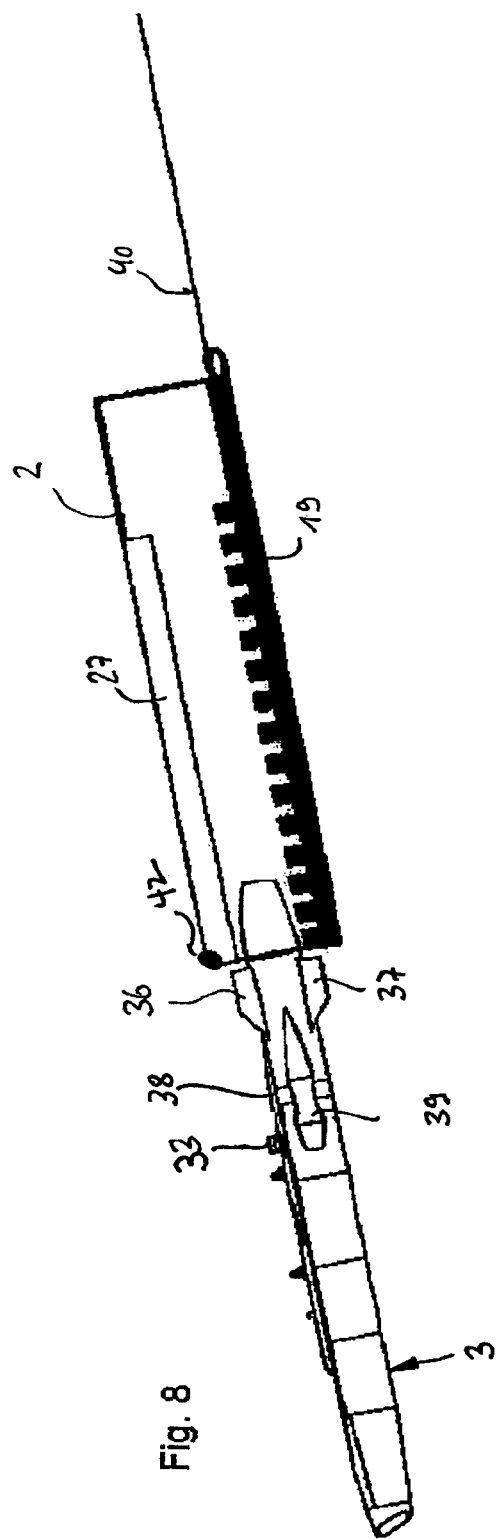
Fig. 7
Fig. 8

DEVICE FOR LAUNCHING UNMANNED MISSILES FROM AN AIRCRAFT

CROSS-REFERENCE TO RELATED APPLICATIONS

The present application is a continuation application of U.S. application Ser. No. 11/766,343 filed Jun. 21, 2007 and claims priority under 35 U.S.C. §119 of German Patent Application No. 10 2006 029 147.6 filed on Jun. 24, 2006, the disclosures of which are expressly incorporated by reference herein in their entireties.

BACKGROUND OF THE INVENTION

1. Field of the Invention

The present invention relates to a device for launching unmanned missiles from an aircraft with a pallet, on which at least one container is provided to receive the missile.

2. Discussion of Background Information

Launching unmanned missiles from an aircraft, in particular from a transport aircraft, is referred to as an "airdrop." Unmanned missiles are ejected from the aircraft during flight through an opened tailgate, at which time the missiles autonomously begin their own flight mission. Unmanned missiles of this type can be, e.g., cruise missiles or reconnaissance drones.

A generic device is known, e.g., from DE 103 38 963 A1. In this generic device three missiles arranged next to one another are suspended on an upper support structure of an extendible platform. The cross section of the extendible platform is in the shape of an inverted "U", with the lower free ends of the vertical legs guided in a guide rail of the cargo hold floor of the transport aircraft. To launch the unmanned missiles, the extendible platform is coupled to a pilot parachute that is ejected from a rear cargo hold door of the transport aircraft. The pilot parachute unfolds and draws out the extendible platform towards the rear from the fuselage of the aircraft in flight due to the drag acting on the pilot parachute. After the extendible platform has left the aircraft, the individual unmanned missiles are uncoupled from the extendible platform and start their respective mission autonomously.

Due to the width of the extendible platform, which is determined by the lateral spacing of the guide rails in the cargo hold floor of the transport aircraft, the upper support structure of the extendible platform must be very stable so that it can reliably carry the unmanned missiles suspended below. This entails a large weight being attributable to the extendible platform. However, such a large weight results in the total load of the unmanned missiles transported in a transport aircraft having to be reduced, which is undesirable.

A device for launching cruise missiles by airdrop launchers from a transport aircraft is known from DE 103 42 565 A1. In this device, the cruise missiles are provided in several rows next to one another and one above the other. In this arrangement, the cruise missiles are guided in transport rails running in the longitudinal direction respectively by use of a pylon carriage on which a respective cruise missile is suspended. The transport rails are provided in a corresponding transport frame in the interior of the transport aircraft. The individual cruise missiles are individually drawn out of the aircraft by use of a pilot parachute attached to the respective pylon carriage, after which the pylon carriage is separated from the unmanned missile.

A similar device, in which the ejection of the missile is not carried out by use of a pilot parachute, is known from U.S. Pat. No. 4,256,012 A. U.S. Pat. No. 5,763,811 also shows a similar device, but for the ejection of bombs from a transport aircraft.

JP-A 04-260900 discloses a launching device for small spacecraft. This device is used for launching and starting small spacecraft from transport aircraft flying at high altitude. The small spacecraft is provided on a pallet held in the transport aircraft in a slidable manner, e.g., by the use of a ground rail. The pallet provided with the small spacecraft is drawn out of the transport aircraft by use of a pilot parachute, and subsequently the small spacecraft glides along the ground rail from the pallet to start its flight mission autonomously.

SUMMARY OF THE INVENTION

The present invention is directed to a device that makes it possible, with a low net weight, to launch several missiles from an aircraft simultaneously. This is attained with a device for launching unmanned missiles from an aircraft with a pallet, on which at least one container is provided to receive a missile. The container has an upper container section that has a pylon for the suspended, detachable support of the missile. The container also has a lower container section that is embodied as a support area for the missile.

The pylon holding the missile in the upper container section and the support area for the missile in the lower container section makes it possible to support the major load of the missile directly on the cargo hold floor of the aircraft, via the support area in the lower container section. This arrangement also makes it possible to provide a defined support of the unmanned missile on the pylon in the upper container area in which electric connections between the parent aircraft and the unmanned missile and corresponding release mechanisms to release the unmanned missile are provided.

The support area in the lower container section is preferably provided with a slideway to transport the missile in its longitudinal direction. Alternatively, instead of the slideway, a roller track can be provided.

In another embodiment of the invention, the pylon is a pylon rail that runs in the longitudinal direction of the container and thus of the missile. The pylon rail is provided in the upper container section. The rear end of the pallet, seen in the missile direction, can preferably be coupled to a pilot parachute.

In an embodiment of the invention, at least one lateral guide rail is provided in the missile container. In a preferred embodiment, one guide rail is provided to the left and right of the missile. Through this arrangement, in addition to the upper rail, the missile is guided laterally when moving out of the container.

In embodiments, it is preferred that the release mechanism for opening the holder of the missile is provided on the pylon. The release mechanism preferably has at least one propellant gas cylinder, which causes the holder of the missile to open, and an ignition device for the propellant gas cylinder. To increase safety, it is preferred that the ignition device be secured against accidental ignition by use of a securing device that has a securing pin provided on the pylon. The ignition device has a delay device, e.g., a hardware timer, which causes the ignition device to be unlocked only after a preset delay period has elapsed after the release of the securing device. This ensures that the pallet can first move away from the aircraft before the ignition device is unlocked.

The securing pin is preferably provided on the front of the pylon. The securing pin can be coupled to a drawgear that is connected to the aircraft. In embodiments, the drawgear is formed by a cable section of an umbilical cable temporarily connecting the missile electrically to the aircraft. In such a structure and arrangement, the drawgear can draw out the securing pin from the securing device at the same time as the separation of the umbilical cable from the missile, thereby releasing the securing device.

In another aspect of the invention, a device for launching unmanned missiles from an aircraft comprises a pallet and at least one container on the pallet. The at least one container is provided to receive a missile. The at least one container has an upper container section that has a pylon for suspended, detachable support of the missile. A lower container section is embodied as a support area for the missile.

The support area has a slideway in its longitudinal direction. The support area has a roller track in its longitudinal direction. The pylon is a pylon rail that runs in a longitudinal direction of the at least one container. A rear end of the pallet is coupled to a pilot parachute. At least one lateral guide rail is in the container. The at least one lateral guide rail is provided in the lower container section.

A release mechanism is provided on the pylon, configured to open a holder of the missile. The release mechanism has at least one propellant gas cylinder which causes the holder of the missile to open, and an ignition device for the propellant gas cylinder. The ignition device is secured against accidental ignition by a securing device that has a securing pin provided on the pylon. The ignition device has a delay mechanism which causes the ignition device to be unlocked only after a preset delay period has elapsed after release of the securing device. The delay mechanism is a hardware timer. The securing pin is provided on a front of the pylon and coupled to a drawgear that is connected to the aircraft. The drawgear is formed by a cable section of an umbilical cable temporarily connecting the missile electrically to the aircraft. The drawgear is configured to draw out the securing pin from the securing device at a same time as a separation of the umbilical cable from the missile, thereby releasing the securing device. An inclination sensor is provided in the container or in the missile. The inclination sensor detects the inclination of the pallet and transmits an inclination signal to the ignition device such that the ignition device is unlocked after a delay period has elapsed depending on the inclination signal.

In another aspect of the invention, a device for launching unmanned missiles from an aircraft comprises at least one container having a lower container section and an upper container section. The at least one container comprises a base plate that is mounted on a pallet and side walls installed on longitudinal sides of the base plate which connect the base plate to a cover plate. The cover plate is in the upper container section. A pylon is provided on the underside of the cover plate in a central area thereof and in the upper container section.

In embodiments, the pylon is a pylon rail that extends in a longitudinal direction of the at least one container. The pylon rail is provided in a rear area with holders to attach an unmanned missile which is in the at least one container. The at least one container comprises a plurality of roller arrangements arranged one behind another in a longitudinal direction of the at least one container on the base plate. The roller arrangements form a roller track that enables an object lying thereon to be moved with a rotary motion of the rollers in the longitudinal direction of the at least one container. The container is configured to open at a front end and a rear end. The pylon is configured to suspend and detachable support a missile therefrom.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 3 through 8 represent stages of the launch operation.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Reference numbers in the specification and the drawings serve only to better clarify the invention and are not intended to restrict the scope of protection.

Figure 1:
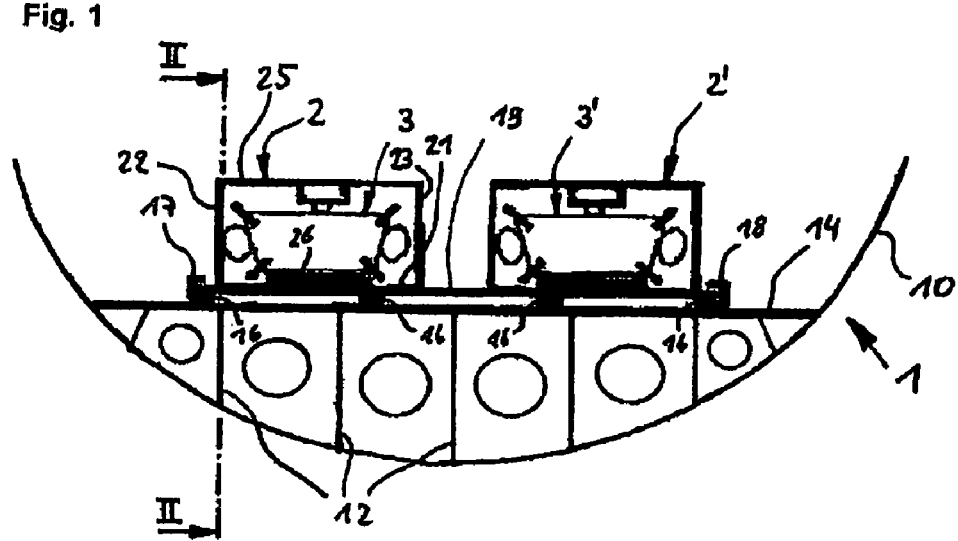
FIG. 1 shows a rear view of a device according to the invention.
Figure 3:
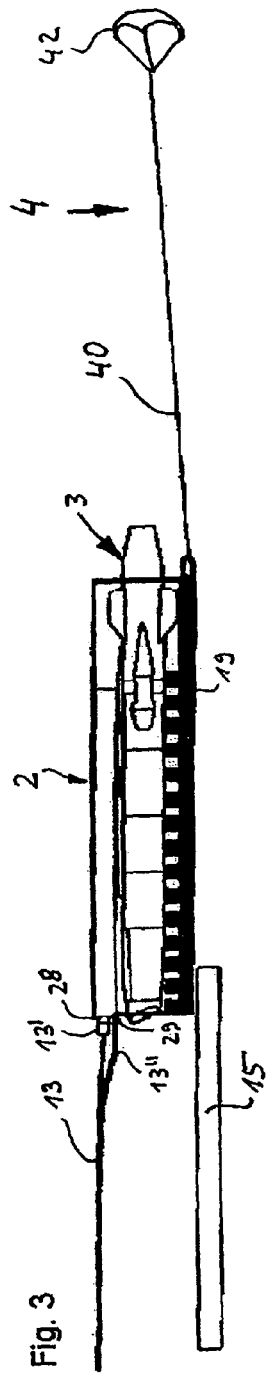
Figure 4:
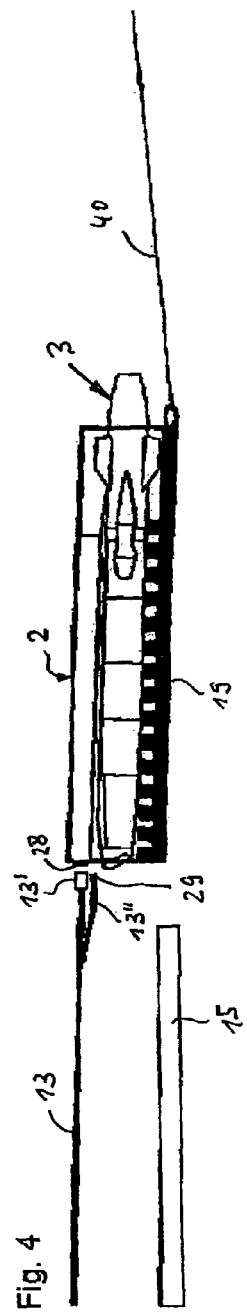
Figure 5:
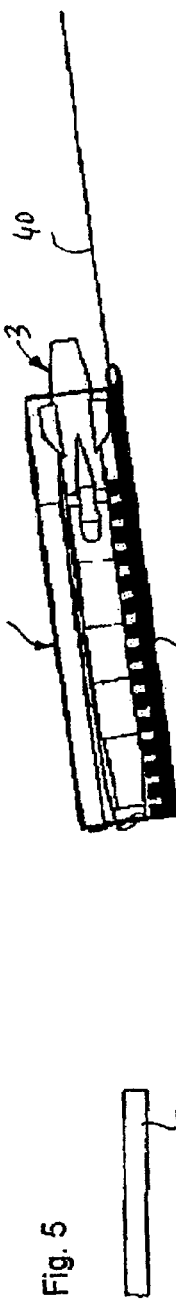

FIG. 1 shows a diagrammatic representation of a fuselage 10 of an aircraft 1 that is used as a transport aircraft for launching unmanned missiles. A loading floor 14 is supported via frame supports 12 on a lower part of the fuselage 10. In embodiments, the loading floor 14 merges in a rear area of the fuselage 10 into a loading platform 15 that can be lowered in a pivoted manner (FIGS. 3-5). The loading floor 14 is provided with roller tracks 16 that run in the longitudinal direction of the aircraft (at right angles to the view plane of FIG. 1). The roller tracks 16 are used to support loads and transport such loads in the longitudinal direction. Corresponding roller tracks are also provided on the loading platform.

Furthermore, lateral guide rails 17, 18 are provided in lateral sections of the loading floor 14. The lateral guide rails 17, 18 run in the longitudinal direction of the aircraft, parallel to the roller tracks 16. The lateral guide rails 17, 18 are used to guide pallets 19 which are supported on the roller tracks 16. The pallets 19 are fixed in the lateral direction by the lateral guide rails 17, 18. To fix the pallets 19 in the longitudinal direction, tie eyelets (not shown) are provided in the loading floor 14 in the area of the frame supports 12.

Two containers 2, 2' are shown next to one another, in the aircraft longitudinal direction, on the pallet 19. The containers 2, 2' each contain an unmanned missile 3, 3'. The containers 2, 2' are embodied in the same manner so only container 2 is explained in detail (e.g., the container 2' corresponds to that of the container 2). The container 2 includes, in its lower container section 20, a base plate 21 that is mounted on the pallet 19. Side walls 22, 23 installed on the longitudinal sides of the base plate 21 connect the base plate 21 to a cover plate 25. The cover plate 25 is provided in the upper container section 24. The cover plate 25 covers the container 2.

Figure 2:
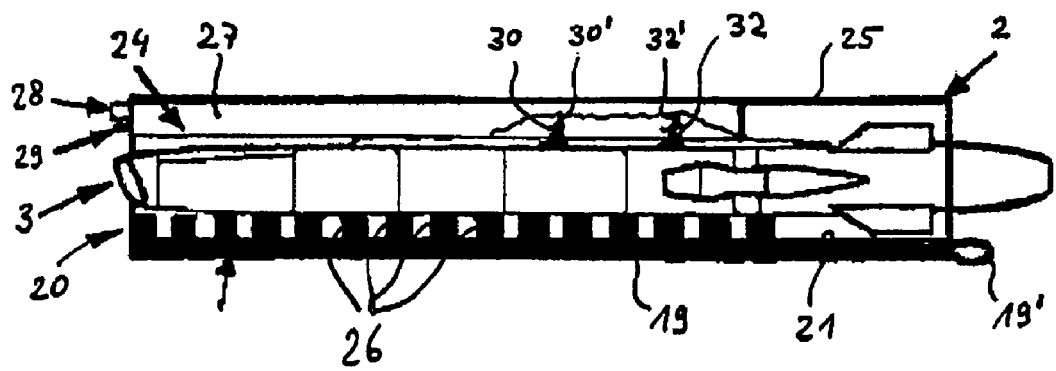
FIG. 2 shows a side partial sectional view of a device according to the invention.

FIG. 2 shows the container 2 in a vertical section along the line II-II in FIG. 1. As shown in FIG. 2, the pallet 19 is provided on its rear end (shown on the right in FIG. 2) with a drawbar eye 19' into which a load cable 40 of a pilot parachute arrangement 4 can be hung (FIGS. 3-8). Several such pallets 19 can be provided one behind the other in the cargo hold of the aircraft 1. As previously discussed, the container 2 is provided with a base plate 21, side walls 22, 23 and a cover plate 25. In this arrangement, the container 2 is formed in a box-shaped structure. The container 2 can be opened at the front end (on the left in FIG. 2) and at the rear end (the right in FIG. 2).

A plurality of roller arrangements 26 is arranged one behind the other in the longitudinal direction of the container 2, on the base plate 21. Each roller arrangement 26 has at least one roller that can be rotated about a roller axis running at right angles to the longitudinal direction and preferably parallel to the base plate 21. The roller arrangements 26 form a roller track that enables an object lying thereon to be moved with a rotary motion of the rollers in the longitudinal direction of the container 2. As is discernible in FIG. 1, for example, the roller arrangements 26 do not extend over the entire width of the base plate 21 of the container, but preferably only in the central area thereof.

A pylon rail 27 is provided on the underside of the cover plate 25, in the central area thereof and in the upper container section 24. The pylon rail 27 extends in the longitudinal direction of the container 2 from the front end thereof (on the left in FIG. 2) into the rear area of the container 2, over approximately three quarters of the length thereof. The pylon rail 27 is provided in the rear area with holders (not shown) to attach an unmanned missile 3 which is in the container 2.

Figure 6:
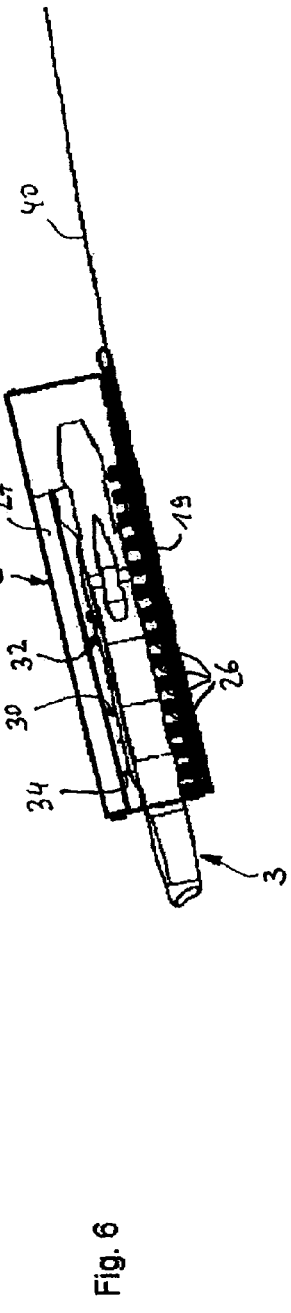

As is customary, e.g., with bomb carriers (hooks), the holders can be opened and the missile 3 released using conventional holding eyelets 30, 32 (FIG. 6). The holding eyelets 30, 32 (e.g., in FIG. 6) engage in the pylon rail 27 and are guided within the pylon rail 27 in the container 2, with the longitudinal movement of the unmanned missile 3.

A pilot pin 34 (FIG. 6) projects upward in the front area of the missile 3. The pilot pin 34 engages in the pylon rail 27 and is guided with a longitudinal movement of the missile 3, through which a yawing of the missile, e.g., a movement about its lift axis, is avoided with a longitudinal movement of the missile 3 within the container 2.

An electric plug connector 28, facing forwards, is provided at the front end of the container 2. The electric plug connector 28 is on the front face of the pylon rail 27 in the upper container section 24. An electric connecting cable (not shown) (inner umbilical cable), running in the pylon rail 27, connects to the plug connector 28. The connecting cable, on its rear free end, has a plug that is detachably connected to a plug connector on the top of the missile 3.

A securing pin 29 is provided on the front of the pylon rail 27. The securing pin 29 is connected to a locking mechanism within the pylon rail 27 so that a longitudinal movement of the missile 3 is not rendered possible until the securing pin 29 has been drawn out of the locking mechanism.

The mode of operation in launching the unmanned missile from the aircraft is described in more detail below with reference to FIGS. 3 through 8. In general, to launch an unmanned missile 3 prepared for autonomous deployment from the aircraft 1 during flight, the loading platform 15 of the aircraft 1 is lowered in flight, as is usual with conventional airdrop maneuvers. Then a pilot parachute 42 of the pilot parachute arrangement 4, attached by a load cable 40 to the drawbar eye 19' of the pallet 19, is ejected backwards against the direction of flight through the cargo opening. The pilot parachute is released by the lowered loading platform 15. The pilot parachute 42 opens due to aerodynamic forces and draws the pallet 19 with the container 2 out of the aircraft fuselage 10.

FIG. 3 shows the pallet 19 provided with the container 2 shortly before leaving the loading platform 15 of the aircraft 1. As shown in FIG. 3, the pallet 19, with the container 2 and the unmanned missile 3 located therein, is supported in the front on the rear area of the loading platform 15.

An outer umbilical cable 13 is inserted via a plug 13' into the electric plug connector 28 of the container 2. This connects the unmanned missile 3 to an electric supply device provided in the aircraft 1, as well as provides a data processing device that supplies an on-board computer of the unmanned missile 3 with electric current and with mission data. This data processing device can be, e.g., a load-monitoring computer of the store management system of the aircraft or an arms-monitoring computer provided in the aircraft. The outer umbilical cable 13 is provided with a cable section 13" on the rear end, adjacent to the plug 13'. The cable section 13" is connected to the securing pin 29 of the container 2.

FIG. 4 shows a stage that occurs after that shown in FIG. 3. In this stage, the pallet 19 with the container 2 and the unmanned missile 3 has left the platform 15 of the aircraft 1. The plug 13' of the outer umbilical cable 13 and the securing pin 29 connected to the cable section 13" have been released from the container 2. At this stage, the current supply from the aircraft 1 to the unmanned missile 3 is interrupted by the release of the plug 13' from the electric plug connector 28 of the container 2. The holders provided in the pylon rail 27, into which holders of the holding eyelets 30, 32 of the unmanned missile 3 engage, are opened after a preset time delay, e.g., through the ignition of corresponding propellant gas cylinders. The propellant gas cylinders are unlocked in a time-delayed manner, e.g., after the plug 13' of the outer umbilical cable 13 has been drawn out of the electric plug connector 28.

FIG. 5 shows a later stage in which the pallet 19 with the container 2 has moved still further away from the loading platform 15 of the aircraft 1. In this stage, the front end of the pallet 19 with the container 2 and the unmanned missile 3 has dropped due to the combined weight. The pallet 10 and the container 2 have a position which is tilted downwards at the front.

Based on a comparison of forces and accelerations acting on the missile 3 located in the container 2 with stored forces and an acceleration profile, and based on a course calculation made from the time elapsed after the separation of the outer umbilical cable 13 from the container 2 and the accelerations detected, the on-board computer of the unmanned missile 3 determines whether the pallet 19 and container 2 is located at a safe distance behind the aircraft 1. The on-board computer furthermore recognizes via an inclination sensor whether the inclination of the pallet is sufficient to make it possible for the missile 3 to roll out of the container 2 by the force of gravity. If both of these are the case, the ignition of the propellant gas cartridges takes place and the missile 3 is then released from the holders of the pylon rail 27. Once the release has occurred, the unmanned missile 3, as shown in FIG. 6, rolls forward out of the container 2 on the roller arrangements 26 along the inclined plane formed by the pallet 19. The container 2 is guided in the pylon rail 27 by the holding eyelets 30, 32 mounted on the top and the pilot pin 34 projecting upwards.

In the stage shown in FIG. 7, the unmanned missile 3 has rolled still further out of the container 2, and the pilot pin 34 and the front holding eyelet 30 have already left the pylon rail 27. In this stage, the inner umbilical cable has been drawn out of the corresponding plug connector of the unmanned missile 3.

In the stage shown in FIG. 8, the unmanned missile 3 has almost completely left the container 2, with only the tail section of the missile 3 behind the stabilizing fins 36, 37 still located inside the container 2. A piston 33 loaded upwards by a compression spring, which is provided on the top of the missile 3 and held down by the pylon rail 27 while the missile 3 was inside the container 2, can now move out upwards after leaving the container 2. After a preset time delay, the piston causes wings 38 to open, e.g., swing out laterally (which were retracted while the missile 3 was in the container 2). The engines 39 of the unmanned missile 3 then start.

An inclination sensor is preferably provided in the container 2 or in the missile 3 to detect the inclination of the pallet 19 and send an inclination signal to an ignition device 42. The ignition device 42 is unlocked after the delay period has elapsed depending on the inclination signal, e.g., not until a preset inclination has been reached.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Also, although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A device for launching unmanned missiles from an aircraft, comprising: an airdrop pallet; and
    at least one container on the airdrop pallet, the one at least one container provided to receive a missile, the at least one container having an upper container section that has a pylon for suspended, detachable support of the missile, and a lower container section that is embodied as a support area for the missile,
    wherein subsequent to release of the pallet from the aircraft, the missile is launched from the pallet while airborne.

2. The device according to claim 1, wherein the support area has a slideway in its longitudinal direction.

3. The device according to claim 1, wherein the support area has a roller track in its longitudinal direction.

4. The device according to claim 1, wherein the pylon is a pylon rail that runs in a longitudinal direction of the at least one container.

5. The device according to claim 1, wherein a rear end of the airdrop pallet is coupled to a pilot parachute.

6. The device according to claim 1, further comprising at least one lateral guide rail in the at least one container.

7. The device according to claim 6, wherein the at least one lateral guide rail is provided in the lower container section.

8. The device according to claim 1, further comprising a release mechanism provided on the pylon, configured to open a holder of the missile.

9. The device according to claim 8, wherein the release mechanism has at least one propellant gas cylinder which causes the holder of the missile to open, and an ignition device for the propellant gas cylinder.

10. The device according to claim 9, wherein the ignition device is secured against accidental ignition by a securing device that has a securing pin provided on the pylon.

11. The device according to claim 10, wherein the ignition device has a delay mechanism which causes the ignition device to be unlocked only after a preset delay period has elapsed after release of the securing device.

12. The device according to claim 11, wherein the delay mechanism is a hardware timer.

13. The device according to claim 12, further comprising an inclination sensor provided in the at least one container or in the missile.

14. The device according to claim 13, wherein the inclination sensor detects the inclination of the pallet and transmits an inclination signal to the ignition device such that the ignition device is unlocked after a delay period has elapsed depending on the inclination signal.

15. The device according to claim 10, wherein the securing pin is provided on a front of the pylon and coupled to a drawgear that is connected to the aircraft.

16. The device according to claim 15, wherein the drawgear is formed by a cable, section of an umbilical cable temporarily connecting the missile electrically to the aircraft.

17. The device of claim 16, wherein the drawgear is configured to draw out the securing pin from the securing device at a same time as a separation of the umbilical cable from the missile, thereby releasing the securing device.

18. A device for launching unmanned missiles from an aircraft, comprising:
    at least one container having a lower container section and an upper container section, the at least one container provided to receive a missile, the at least one container comprising a base plate that is mounted on an airdrop pallet and sidewalls installed on longitudinal sides of the base plate which connect the base plate to a cover plate, the cover plate being in the upper container section; and
    a pylon being provided on the underside of the cover plate in a central area thereof and in the upper container section,
    wherein subsequent to release of the pallet from the aircraft, the missile is launched from the pallet while airborne.

19. The device according to claim 18, wherein the pylon is a pylon rail that extends in a longitudinal direction of the at least one container.

20. The device according to claim 19, wherein the pylon rail is provided in a rear area with holders to attach an unmanned missile which is in the at least one container.

21. The device of claim 18, wherein the pylon is configured to suspend and detachably support a missile therefrom.

22. The device according to claim 18, wherein the at least one container comprises a plurality of roller arrangements arranged one behind another in a longitudinal direction of the at least one container on the base plate, the roller arrangements form a roller track that enables an object lying thereon to be moved with a rotary motion of the rollers in the longitudinal direction of the at least one container.

23. The device according to claim 18, wherein the container is configured to open at a front end and a rear end.

* * * * *